(12) United States Patent
Saruta et al.

(10) Patent No.: US 8,084,931 B2
(45) Date of Patent: Dec. 27, 2011

(54) FLUORESCENT MATERIAL SUBSTRATE AND IMAGE DISPLAY DEVICE, AND METHODS FOR MANUFACTURE THEREOF

(75) Inventors: Shoshiro Saruta, Sagamihara (JP); Makoto Souma, Yokohama (JP); Atsushi Miida, Fujisawa (JP); Akemi Watanabe, Hiratsuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 171 days.

(21) Appl. No.: 12/711,117

(22) Filed: Feb. 23, 2010

(65) Prior Publication Data
US 2010/0213816 A1    Aug. 26, 2010

(30) Foreign Application Priority Data
Feb. 25, 2009   (JP) ................. 2009-041863

(51) Int. Cl.
*H01J 1/62*   (2006.01)

(52) U.S. Cl. ................. 313/483; 252/301.4 R
(58) Field of Classification Search .......... 313/483–487; 252/301.4 R
See application file for complete search history.

(56) References Cited

U.S. PATENT DOCUMENTS
2006/0214576 A1 *  9/2006  Takahashi et al. ............ 313/506

FOREIGN PATENT DOCUMENTS
JP          2002-338959 A      11/2002

* cited by examiner

*Primary Examiner* — Anne Hines

(57) ABSTRACT

Degradation of a fluorescent material used in an image display device provided with an electron emitting device that is caused by heating in the process of manufacturing the device is prevented.

A coating layer 44b composed of $SiO_2$ is formed on the surface of fluorescent material particles 44a, and any metal 49 from among Bi, Pb, Sn, and Sb is added to the coating layer 44b so that the metal concentration at the surface of the coating layer is equal to or greater than 0.05 ppm.

10 Claims, 2 Drawing Sheets

FLUORESCENT MATERIAL SUBSTRATE AND IMAGE DISPLAY DEVICE, AND METHODS FOR MANUFACTURE THEREOF

BACKGROUND OF THE INVENTION

1. Field of the Invention

The present invention relates to a flat image display device having a fluorescent material as a light-emitting material, such as a field emission display device (FED) and a plasma display device (PDP). More particularly, the present invention relates to a fluorescent material and a fluorescent substrate for use in a flat image display device.

2. Description of the Related Art

In a flat image display device such as FED and PDP, an image is displayed by energizing a fluorescent material. Therefore, fluorescent materials with a high luminance have to be used in such flat image display devices.

However, the luminance of the fluorescent material can be degraded in the process of manufacturing the flat image display device having the fluorescent material. The luminance of the fluorescent material can also degrade in a long-term use of the image display device after the image device has been manufactured.

Accordingly, a configuration has been suggested in which a coating layer including $SiO_2$ as the main component is formed on the surface of fluorescent particles and the fluorescent particles are protected (Japanese Patent Laid-Open No. 2002-338959).

SUMMARY OF THE INVENTION

However, even when a fluorescent material has a coating layer formed thereon, when the fluorescent material is heated in the process of manufacturing the image display device, cracks appear in the coating layer, the surface of fluorescent particle is charged, and the fluorescent material is degraded.

An aspect of the present invention provides a method for manufacturing a fluorescent material substrate in which degradation of luminance is inhibited, and a method for manufacturing an image display device.

Another aspect of the present invention provides a fluorescent material substrate in which degradation of luminance is inhibited and an image display device using the fluorescent material substrate.

The first aspect of the invention relates to a method for manufacturing a fluorescent material substrate, including:

providing a fluorescent material by including any metal from among Bi, Pb, Sn, and Sb in a coating layer that coats the surface of one or more fluorescent particles, the coating layer containing $SiO_2$, so that a concentration of the metal in the surface of the coating layer becomes equal to or higher than 0.05 ppm; and disposing the fluorescent material having the fluorescent particles, the coating layer that coats the surface of the fluorescent particles, and the metal included in the coating layer on a substrate and heating the fluorescent material.

The second aspect of the invention relates to a method for manufacturing an image display device including an electron source substrate having an electron emitting device and a fluorescent material substrate having a fluorescent material, wherein the fluorescent material substrate is manufactured by the method for manufacturing a fluorescent material substrate according to the first aspect.

The third aspect of the invention relates to a fluorescent material substrate comprising a substrate, fluorescent particles disposed on the substrate, a coating layer including $SiO_2$ and coating a surface of the fluorescent particles, and any metal from among Bi, Pb, Sn, Sb that is added to a surface of the coating layer, wherein a concentration of the metal in the surface of the coating layer is equal to or greater than 0.05 ppm.

The fourth aspect of the invention relates to an image display device including an electron source substrate having an electron emitting device and a fluorescent material substrate having a fluorescent material, wherein the fluorescent material substrate is the fluorescent material substrate according to the third aspect of the invention.

In accordance with the invention, in a fluorescent material provided with a coating layer on the surface of fluorescent particles, the occurrence of cracks in the coating layer and decrease in luminance can be inhibited even through the heating process. Therefore, in accordance with the invention, a fluorescent material substrate provided with a fluorescent material in which the degradation of luminance is inhibited can be realized and an image display device with high-quality display can be provided using this fluorescent material substrate.

Further features of the present invention will become apparent from the following description of exemplary embodiments with reference to the attached drawings.

DESCRIPTION OF THE EMBODIMENTS

The configuration of the image display device in accordance with the present invention will be described below with reference to FIG. 1.

The image display device in accordance with the invention includes an electron source substrate having an electron emitting device and a fluorescent material substrate having a fluorescent material, wherein the fluorescent material substrate is the below-described fluorescent material substrate in accordance with the invention. With the method for manufacturing an image display device in accordance with the invention, the fluorescent material substrate is manufactured by the below-described method for manufacturing a fluorescent material substrate in accordance with the invention.

Figure 1:
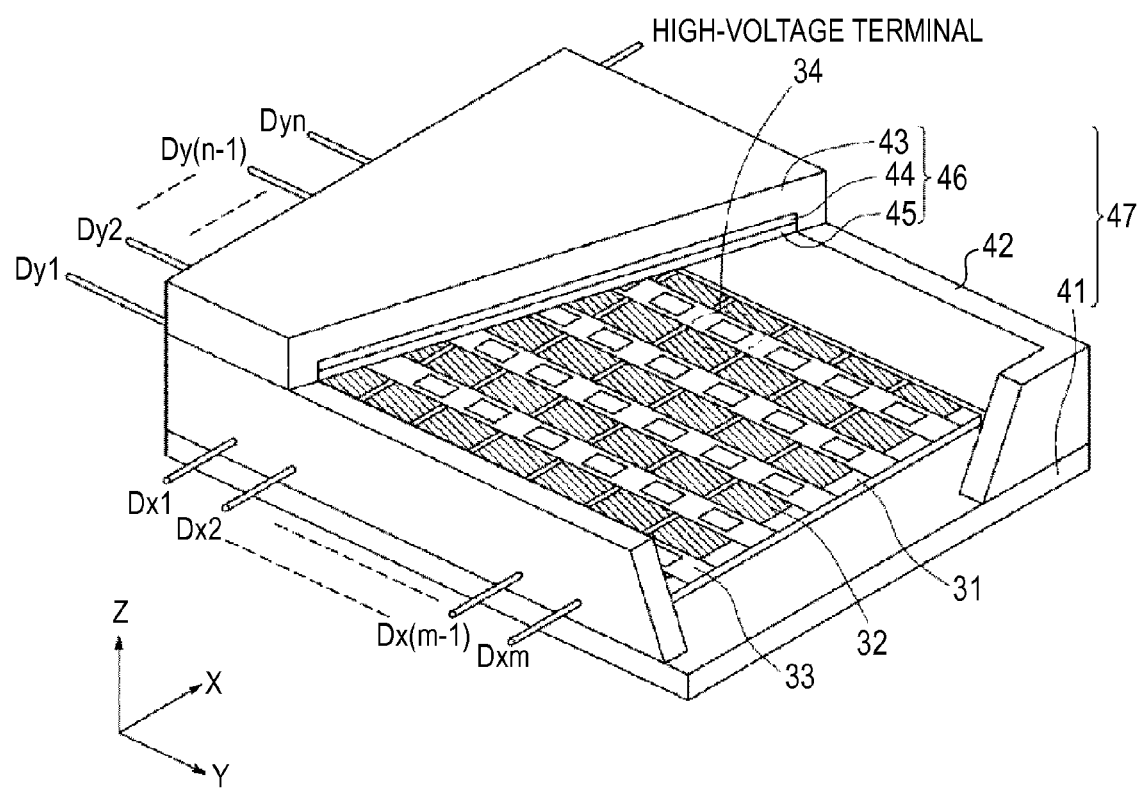
FIG. 1 is a schematic perspective view illustrating the entire configuration of one example of the image display device in accordance with the invention.

FIG. 1 is a perspective view illustrating a schematic configuration of one embodiment of the image display device in accordance with the present invention and shows a partially cut-out state. In the figure, the reference numeral 31 represents an electron source substrate, 32 represents an X-direction wiring, 33 represents an Y-direction wiring, and 34 represents an electron emitting device. An electron emitting device of a surface conductivity type and electron emitting device of a spint type, a MIM type, and a carbon nanotubes type can be used as the electron emitting device 34. The reference numeral 41 represents a substrate (rear plate) to which the electron source substrate 31 is fixed, 46 represents a fluorescent material substrate (face plate) in which the fluorescent material 44 and a metal back 45 serving as an anode electrode are formed on the inner surface of a glass substrate 43. The reference numeral 42 represents a support frame. The substrate 41 and fluorescent material substrate 46 are attached to the support frame 42 by frit glass or the like, thereby configuring a housing 47. The substrate 41 is provided mainly with the object of enhancing the strength of the electron source substrate 31. Therefore, in a case where the electron source substrate 31 itself has a sufficient strength, the separate substrate 41 is unnecessary. Further, a configuration imparted with a sufficient strength with respect to atmospheric pressure can be obtained by disposing a support body (not shown in the figure) called a spacer between the fluorescent material substrate 46 and the substrate 41.

A total of m X-direction wirings 32 are connected to terminals Dx1, Dx2, . . . Dxm. A total of n Y-direction wirings 33 are connected to terminals Dy1, Dy2, . . . Dyn (m and n are both positive integers). An interlayer insulating layer (not shown in the figure) is provided between the m X-direction wirings 32 and n Y-direction wirings 33, and the wirings of two kinds are electrically separated.

A high-voltage terminal is connected to the metal back 45, and a DC voltage of, for example, 10 kV is applied. This voltage is an accelerating voltage for imparting the energy sufficient to excite the fluorescent material to the electrons emitted from the electron emitting device.

Figure 2A:
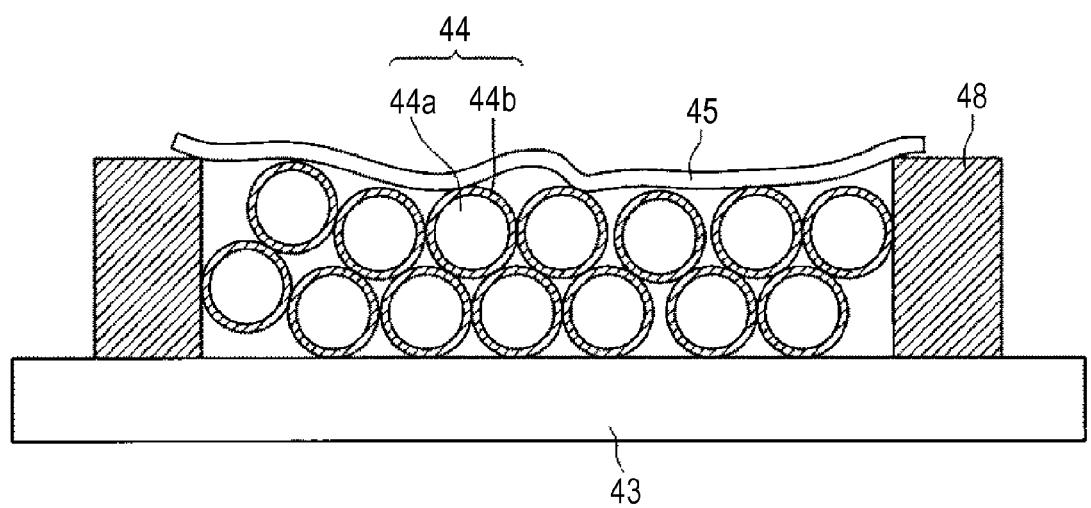
FIG. 2A is a cross-sectional schematic view illustrating a configuration of a fluorescent material substrate obtained in accordance with the invention.
Figure 2B:
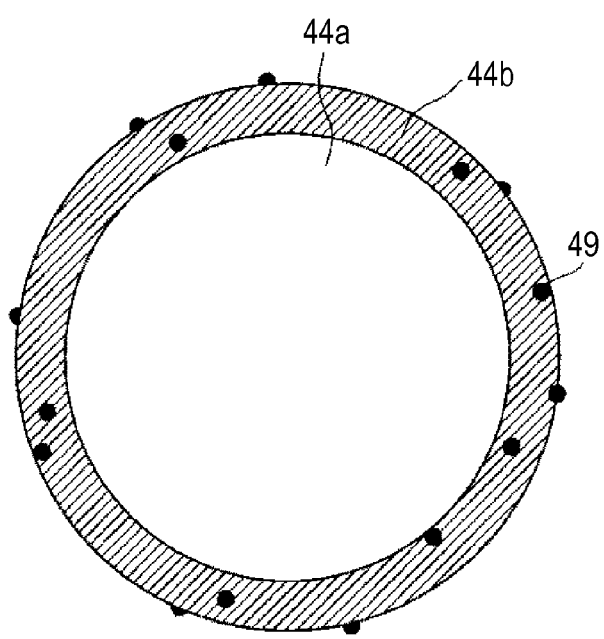
FIG. 2B is a cross-sectional schematic view illustrating a configuration of a fluorescent material in accordance with the invention.

FIG. 2A illustrates the configuration of the fluorescent material substrate 46 shown in FIG. 1. As shown in FIG. 2A, a black matrix 48 is formed on the glass substrate 43. The fluorescent material 44 is formed between zones of the black matrix 48, and the metal back 45 is formed on the fluorescent material 44. FIG. 2B is an enlarged cross-sectional schematic view of the fluorescent material 44.

As shown in FIG. 2B, the fluorescent material substrate in accordance with the invention has the substrate 43, fluorescent particles 44a disposed on the substrate, a coating layer 44b including $SiO_2$ and coating the surface of the fluorescent particles 44a, and a specific metal 49 added to the surface of the coating layer 44b. Because the specific metal 49 is thus present at the surface of the coating layer 44b, the occurrence of cracks in the coating layer 44b in the below-described heating process can be inhibited. The metal 49 may be contained not only at the surface of the coating layer 44b, but also inside thereof.

The method for manufacturing a fluorescent material substrate in accordance with the invention includes providing the specific metal 49 at the surface of the coating layer 44b of the fluorescent particles 44a having the coating layer 44b including $SiO_2$ on the surface thereof and then disposing the fluorescent material 44 on the substrate 43 and heating.

The fluorescent material used in accordance the invention is a fluorescent material that is typically used in image display devices. Specific examples of the fluorescent material include $SrGa_2S_4:Eu^{2+}$, $BaAl_2S_4:Eu$, $CaAlSiN_3:Eu$, $CaS:Eu$, $Sr_2Si_5N_8:Eu$, $SrY_2S_4:Eu$, $CaMgSi_2O_6:Eu$, $ZnS:Cu$, and Al(P22). Among them, a fluorescent material with a thiogallate matrix is preferred, alkaline earth thiogallates are especially preferred, and among them strontium thiogallate is preferred. The activator is preferably $Eu^{2+}$, but $Ce^{3+}$ can be also used instead of $Eu^{2+}$.

The average particle size of fluorescent particles 44a is 4 μm to 6 μm.

For example, a method described in the aforementioned Japanese Patent Laid-Open No. 2002-338959 can be used to form the coating layer 44b in accordance with the present invention. The coating layer 44b includes $SiO_2$. It is preferred that the coating layer be composed of $SiO_2$ or have $SiO_2$ as the main component. The thickness of the coating layer 44b is preferably 30 μm to 100 μm. Because the coating layer 44b is usually formed using an alkoxide compound, a metal such as barium, strontium, and aluminum sometimes remains in the coating layer 44b.

In accordance with the invention, a metal included in the coating layer 44b is any from among Bi, Pb, Sn, and Sb. The metal is included so that the concentration thereof in the surface of the coating layer 44b is equal to or greater than 0.05 ppm. When fluorescent particles with an $Eu^{2+}$ activator are used, where the amount of metal included in the coating layer 44b is too large, the metal can reach the surface of the fluorescent particles 44a and oxidize the fluorescent particles 44a. Therefore, in a case where fluorescent particles 44a with an $Eu^{2+}$ activator are used, it is desirable that the metal concentration at the surface of the coating layer 44b be equal to or less than 10 ppm.

The fluorescent material is disposed on the substrate 43 by disposing a mixture of the fluorescent material 44 and a resin by a printing method or an ink jet method and then burning out the resin by heating. Specific examples of the resin include polyvinyl butyral, polyvinyl acetate, polyvinyl alcohol, cellulose polymers, polyethylene, silicone polymers, polystyrene, and acrylic polymers. Examples of the cellulose polymers include methyl cellulose, ethyl cellulose, hydroxyethyl cellulose, and methyl hydroxyethyl cellulose. Examples, of the silicone polymers include polymethylsiloxane and polymethylphenylsiloxane.

In accordance with the present invention, because the specific metal 49 is included in the coating layer 44b that coats the surface of the fluorescent particles 44a, the occurrence of cracks in the coating layer 44b in the heating process can be inhibited and the decrease in luminance is reduced.

EXAMPLES

Examples 1 to 8

Fluorescent particles of $SrGa_2S_4:Eu^{2+}$, which had a thiogallate matrix and an $Eu^{2+}$ activator, were used and a coating layer composed of $SiO_2$ was formed on the surface thereof. Coating layers of two kinds were obtained: with a thickness of 100 nm and 30 nm.

The coating layer with a thickness of 30 nm was obtained by hydrolyzing a silicon alkoxide compound in a filler dispersion. The procedure is described below.

First, 100 g of a fluorescent material powder was weighed and loaded in a beaker with a capacity of 1 L that contained 500 mL of special grade ethanol. The powder was dispersed using a rubber stirrer. Then, about 8 g of tetraethoxysilane (TEOS: manufactured by Kishida Chemical KK) was dropwise added and pure water was then dropwise added at a rate of 10 mL/min to obtain a total of 1000 mL under stirring. The stirring was continued for 1 h even after completion of dropwise addition, the system was allowed to stay, the supernatant was removed, pure water was added, and stirring was performed. This operation was repeated five times, followed by filtration. The filtration cake was dried for 2 h at a temperature of 140° C., thereby producing $SiO_2$-coated fluorescent particles.

The coating layer with a thickness of 100 nm could be obtained by a similar procedure by adding 27 g of TEOS. A process of conducting microcapsule coating on a filler substance by using TEOS is described, for example, by Yano Shoichiro et al. Nippon Reoloji Gakkaishi, vol. 33, 2005. More specifically, there is a method by which a suspension is directly produced in water, an acid serving as a catalyst is dropwise added to the system, and hydrolysis is initiated, but because acids adversely affect fluorescent materials, a method was used by which polarity in the solvent was gradually increased and hydrolysis was conducted without using a catalyst.

The obtained coating layer continuously covered the surface of fluorescent particles.

Then, Bi was included as the aforementioned metal in the coating layer. More specifically, bismuth oxide (bismuth (III) oxide, manufactured by Nakarai Tesuku KK) was dispersed in terpineol, the fluorescent particles with the coating layer formed on the surface thereof were mixed with the solution, stirring was conducted, and terpineol was then evaporated at 150° C. Bi of desired concentration can be included in the coating layer by adjusting the amount of bismuth oxide.

In Examples 1 to 4, the coating layer thickness was 100 nm and the amount of included Bi was varied. In Examples 5 to 8, the coating layer thickness was 30 nm and the amount of included B was varied.

The concentration of Bi in the surface of the coating layer after Bi was included therein was measured by ICP-MS (inductively coupled plasma mass spectrometry). More specifically, the concentration of each element was found by conducting measurements at the fluorescent material with ICP-MS (Thermo Fisher Scientific Co., Ltd.; X Series 2 ICP-MS). With this method the concentration of Bi included in the fluorescent material is found, but because in the present example Bi was included in the coating layer surface, the concentration of Bi found by this method is the concentration of Bi included in the coating layer surface. The concentrations of below-described Pb, Sn, Sb were measured by similar measurement methods.

Ethyl cellulose was then used as a binder resin and a fluorescent material paste was fabricated. The fluorescent material paste was coated on a glass substrate by screen printing. Then calcining was conducted at a calcining temperature of 450° C., and a fluorescent material substrate was obtained. The concentration of Bi in the coating layer of the fluorescent material in the fluorescent material substrate after calcining was measured by the above-described ICP-MS (inductively coupled plasma mass spectrometry) method. More specifically, the fluorescent material was sampled from the calcined fluorescent material substrate, the sample was weighed in a Teflon® beaker, hydrolysis was conducted with sulfuric acid, nitric acid, and hydrochloric acid, and then heating and dissolution were conducted in diluted aqua regia to obtain a fixed volume. The concentration of Bi in the solution was measured by ICP-MS and the content in the sample was found.

The calcined fluorescent material was checked by cross-sectional TEM. The results confirmed that no cracks were present in the coating layer.

Cathode luminescence luminance measurements of the fluorescent material were then conducted by using a luminance meter (BM7, manufactured by TOPCON). The luminescence luminance was measured by irradiating each fluorescent material film with an electron beam at an accelerating voltage of 10 kV and a current density of 1 $\mu A/mm^2$.

The results demonstrated that the relative luminance was the same in Examples 1 to 8. The luminance of the fluorescent material in Examples 1 to 8 is taken as a reference (100%) of relative luminance.

A half-life supplied charge amount Q ($C/cm^2$) of the fluorescent material film was found in the following manner.

The fluorescent material film was continuously irradiated with an electron beam at an accelerating voltage of 10 kV and a current density of 1 $\mu A/mm^2$ to cause the degradation of the fluorescent material, while measuring the luminance. The supplied charge amount was calculated from a product of the current density and the integral value of irradiation time till the luminescence luminance of the fluorescent material decreased by half, this charge amount was taken as the half-life supplied charge amount Q ($C/cm^2$), and the life of the fluorescent material was evaluated.

The evaluation results of the fluorescent material obtained in Examples 1 to 4 are shown in Table 1, and the evaluation results of the fluorescent material obtained in Examples 5 to 8 are shown in Table 2.

TABLE 1

|  | Example 1 | Example 2 | Example 3 | Example 4 |
|---|---|---|---|---|
| Metal type | Bi | Bi | Bi | Bi |
| Metal oxide (g)/terpineol (g) | $2.2 \times 10^{-4}/1000$ | $4.5 \times 10^{-4}/1000$ | $4.5 \times 10^{-3}/1000$ | $4.5 \times 10^{-2}/1000$ |
| Metal concentration in coating layer surface before calcination (ppm) | 0.05 | 0.1 | 1 | 10 |
| Metal concentration in coating layer surface after calcination (ppm) | 0.05 | 0.1 | 1 | 10 |
| Thickness of coating layer (nm) | 100 | 100 | 100 | 100 |
| Cracks | None | None | None | None |
| Relative luminance L (%) | 100 | 100 | 100 | 100 |
| Half-life supplied charge amount Q ($C/cm^2$) | 300 | 300 | 300 | 300 |

TABLE 2

|  | Example 5 | Example 6 | Example 7 | Example 8 |
|---|---|---|---|---|
| Metal type | Bi | Bi | Bi | Bi |
| Metal oxide (g)/terpineol (g) | $2.2 \times 10^{-4}/1000$ | $4.5 \times 10^{-4}/1000$ | $4.5 \times 10^{-3}/1000$ | $4.5 \times 10^{-2}/1000$ |
| Metal concentration in coating layer surface before calcination (ppm) | 0.05 | 0.1 | 1 | 10 |

TABLE 2-continued

|  | Example 5 | Example 6 | Example 7 | Example 8 |
|---|---|---|---|---|
| Metal concentration in coating layer surface after calcination (ppm) | 0.05 | 0.1 | 1 | 10 |
| Thickness of coating layer (nm) | 30 | 30 | 30 | 30 |
| Cracks | None | None | None | None |
| Relative luminance L (%) | 100 | 100 | 100 | 100 |
| Half-life supplied charge amount Q (C/cm$^2$) | 300 | 300 | 300 | 300 |

Comparative Examples 1 to 8

Fluorescent materials were prepared by the same method as in Examples 1 to 8, except that the concentration of Bi included in the coating layer was changed, and fluorescent material substrates were fabricated and evaluated. The thickness of the coating layer in Comparative Examples 1 to 4 was 100 nm and the thickness of the coating layer in Comparative Examples 5 to 8 was 30 nm. No Bi was included in Comparative Examples 1 and 5. The results are shown in Table 3 and Table 4.

The fluorescent materials in the fluorescent material substrates after calcination were checked by cross-sectional TEM, and the presence of cracks in the coating layer was confirmed in all Comparative Examples 1 to 8. In particular, it was found that the number of cracks increases with the decrease in Bi concentration in the coating layer surface.

Further, the relative luminance in Comparative Examples 1 to 8 was lower than in Examples to 8. In particular, the relative luminance decreased with the decrease in Bi concentration in the coating layer surface.

The half-life supplied charge amount Q (C/cm$^2$), which is the amount of charge supplied before the life of the fluorescent material decreased by half, was lower in Comparative Examples 1 to 8 than in Examples 1 to 8. In particular, the half-life supplied charge amount decreased with the decrease in Bi concentration in the coating layer surface. This was apparently because the surface of fluorescent material particles was electrically charged and the fluorescent material was degraded because cracks appeared in the coating layer surface.

TABLE 3

|  | Comparative Example 1 | Comparative Example 2 | Comparative Example 3 | Comparative Example 4 |
|---|---|---|---|---|
| Metal type | Bi | Bi | Bi | Bi |
| Metal oxide (g)/terpineol (g) | 0 | $4.5 \times 10^{-5}$/1000 | $8.9 \times 10^{-5}$/1000 | $1.8 \times 10^{-4}$/1000 |
| Metal concentration in coating layer surface before calcination (ppm) | 0 | 0.01 | 0.02 | 0.04 |
| Metal concentration in coating layer surface after calcination (ppm) | 0 | 0.01 | 0.02 | 0.04 |
| Thickness of coating layer (nm) | 100 | 100 | 100 | 100 |
| Cracks | Large number | Large number | Rather large number | Small number |
| Relative luminance L (%) | 71 | 73 | 81 | 90 |
| Half-life supplied charge amount Q (C/cm$^2$) | 50 | 60 | 140 | 200 |

TABLE 4

|  | Comparative Example 5 | Comparative Example 6 | Comparative Example 7 | Comparative Example 8 |
|---|---|---|---|---|
| Metal type | Bi | Bi | Bi | Bi |
| Metal oxide (g)/terpineol (g) | 0 | $4.5 \times 10^{-5}$/1000 | $8.9 \times 10^{-5}$/1000 | $1.8 \times 10^{-4}$/1000 |
| Metal concentration in coating layer surface before calcination (ppm) | 0 | 0.01 | 0.02 | 0.04 |
| Metal concentration in coating layer surface after calcination (ppm) | 0 | 0.01 | 0.02 | 0.04 |
| Thickness of coating layer (nm) | 30 | 30 | 30 | 30 |
| Cracks | Large number | Large number | Rather large number | Small number |
| Relative luminance L (%) | 65 | 70 | 75 | 80 |
| Half-life supplied charge amount Q (C/cm$^2$) | 40 | 45 | 64 | 140 |

The above-described Examples 1 to 8 and Comparative Examples 1 to 8 demonstrated that the occurrence of cracks in the coating layer surface can be inhibited by setting the concentration of Bi in the coating layer surface to a value equal to or greater than 0.05 ppm.

Examples 9 to 12 and Comparative Examples 9 to 12

Fluorescent materials were prepared by the same method as in Examples 1 to 8 and Comparative Examples 1 to 8, except that Pb was used instead of Bi as the metal included in the coating layer surface, and fluorescent material substrates were fabricated and evaluated. The results are shown in Table 5 and Table 6.

TABLE 5

|  | Example 9 | Example 10 | Comparative Example 9 | Comparative Example 10 |
|---|---|---|---|---|
| Metal type | Pb | Pb | Pb | Pb |
| Metal oxide (g)/terpineol (g) | $5.8 \times 10^{-5}$/1000 | $1.2 \times 10^{-2}$/1000 | 0 | $4.6 \times 10^{-5}$/1000 |
| Metal concentration in coating layer surface before calcination (ppm) | 0.05 | 10 | 0 | 0.04 |
| Metal concentration in coating layer surface after calcination (ppm) | 0.05 | 10 | 0 | 0.04 |
| Thickness of coating layer (nm) | 100 | 100 | 100 | 100 |
| Cracks | None | None | Large number | Small number |
| Relative luminance L (%) | 100 | 100 | 70 | 92 |
| Half-life supplied charge amount Q (C/cm$^2$) | 300 | 300 | 52 | 205 |

TABLE 6

|  | Example 11 | Example 12 | Comparative Example 11 | Comparative Example 12 |
|---|---|---|---|---|
| Metal type | Pb | Pb | Pb | Pb |
| Metal oxide (g)/terpineol (g) | $5.8 \times 10^{-5}$/1000 | $1.2 \times 10^{-2}$/1000 | 0 | $4.6 \times 10^{-5}$/1000 |
| Metal concentration in coating layer surface before calcination (ppm) | 0.05 | 10 | 0 | 0.04 |
| Metal concentration in coating layer surface after calcination (ppm) | 0.05 | 10 | 0 | 0.04 |
| Thickness of coating layer (nm) | 30 | 30 | 30 | 30 |
| Cracks | None | None | Large number | Small number |
| Relative luminance L (%) | 100 | 100 | 66 | 91 |
| Half-life supplied charge amount Q (C/cm$^2$) | 300 | 240 | 44 | 205 |

The above-described Examples 9 to 12 and Comparative Examples 9 to 12 demonstrated that the occurrence of cracks in the coating layer surface could be inhibited by setting the concentration of Pb in the coating layer surface to a value equal to or greater than 0.05 ppm.

Examples 13 to 16 and Comparative Examples 13 to 16

Fluorescent materials were prepared by the same method as in Examples 1 to 8 and Comparative Examples 1 to 8, except that Sn was used instead of Bi as the metal included in the coating layer surface, and fluorescent material substrates were fabricated and evaluated. The results are shown in Table 7 and Table 8.

TABLE 7

|  | Example 13 | Example 14 | Comparative Example 13 | Comparative Example 14 |
|---|---|---|---|---|
| Metal type | Sn | Sn | Sn | Sn |
| Metal oxide (g)/terpineol (g) | $5.7 \times 10^{-5}$/1000 | $1.1 \times 10^{-2}$/1000 | 0 | $4.5 \times 10^{-5}$/1000 |
| Metal concentration in coating layer surface before calcination (ppm) | 0.05 | 10 | 0 | 0.04 |
| Metal concentration in coating layer surface after calcination (ppm) | 0.05 | 10 | 0 | 0.04 |
| Thickness of coating layer (nm) | 100 | 100 | 100 | 100 |
| Cracks | None | None | Large number | Small number |
| Relative luminance L (%) | 100 | 100 | 70 | 90 |
| Half-life supplied charge amount Q (C/cm$^2$) | 300 | 300 | 50 | 210 |

TABLE 8

|  | Example 15 | Example 16 | Comparative Example 15 | Comparative Example 16 |
|---|---|---|---|---|
| Metal type | Sn | Sn | Sn | Sn |
| Metal oxide (g)/terpineol (g) | $5.7 \times 10^{-5}$/ 1000 | $1.1 \times 10^{-2}$/ 1000 | 0 | $4.5 \times 10^{-5}$/ 1000 |
| Metal concentration in coating layer surface before calcination (ppm) | 0.05 | 10 | 0 | 0.04 |
| Metal concentration in coating layer surface after calcination (ppm) | 0.05 | 10 | 0 | 0.04 |
| Thickness of coating layer (nm) | 30 | 30 | 30 | 30 |
| Cracks | None | None | Large number | Small number |
| Relative luminance L (%) | 100 | 100 | 67 | 90 |
| Half-life supplied charge amount Q (C/cm$^2$) | 300 | 255 | 45 | 205 |

The above-described Examples 13 to 16 and Comparative Examples 13 to 16 demonstrated that the occurrence of cracks in the coating layer surface could be inhibited by setting the concentration of Sn in the coating layer surface to a value equal to or greater than 0.05 ppm.

Examples 17 to 20 and Comparative Examples 17 to 20

Fluorescent materials were prepared by the same method as in Examples 1 to 8 and Comparative Examples 1 to 8, except that Sb was used instead of Bi as the metal included in the coating layer surface, and fluorescent material substrates were fabricated and evaluated. The results are shown in Table 9 and Table 10.

TABLE 9

|  | Example 17 | Example 18 | Comparative Example 17 | Comparative Example 18 |
|---|---|---|---|---|
| Metal type | Sb | Sb | Sb | Sb |
| Metal oxide (g)/terpineol (g) | $2.4 \times 10^{-4}$/ 1000 | $4.8 \times 10^{-2}$/ 1000 | 0 | $1.9 \times 10^{-4}$/ 1000 |
| Metal concentration in coating layer surface before calcination (ppm) | 0.05 | 10 | 0 | 0.04 |
| Metal concentration in coating layer surface after calcination (ppm) | 0.05 | 10 | 0 | 0.04 |
| Thickness of coating layer (nm) | 100 | 100 | 100 | 100 |
| Cracks | None | None | Large number | Small number |
| Relative luminance L (%) | 100 | 100 | 70 | 80 |
| Half-life supplied charge amount Q (C/cm$^2$) | 300 | 300 | 50 | 190 |

TABLE 10

|  | Example 19 | Example 20 | Comparative Example 19 | Comparative Example 20 |
|---|---|---|---|---|
| Metal type | Sb | Sb | Sb | Sb |
| Metal oxide (g)/terpineol (g) | $2.4 \times 10^{-4}$/ 1000 | $4.8 \times 10^{-2}$/ 1000 | 0 | $1.9 \times 10^{-4}$/ 1000 |
| Metal concentration in coating layer surface before calcination (ppm) | 0.05 | 10 | 0 | 0.04 |
| Metal concentration in coating layer surface after calcination (ppm) | 0.05 | 10 | 0 | 0.04 |
| Thickness of coating layer (nm) | 30 | 30 | 30 | 30 |
| Cracks | None | None | Large number | Small number |
| Relative luminance L (%) | 100 | 100 | 65 | 92 |
| Half-life supplied charge amount Q (C/cm$^2$) | 300 | 260 | 40 | 210 |

The above-described Examples 17 to 20 and Comparative Examples 17 to 20 demonstrated that the occurrence of cracks in the coating layer surface could be inhibited by setting the concentration of Sb in the coating layer surface to a value equal to or greater than 0.05 ppm.

Examples 21 to 36

Fluorescent materials were prepared and fluorescent material substrate were fabricated and evaluated by the same method as in Examples 1 to 20, except that fluorescent material particles were replaced with ZnS:Cu, Al(P22) with an average particle size of 4 to 6 μm and the concentration of metal in the coating layer surface was changed. The results are shown in Table 11 and Table 12.

TABLE 11

|  | Exam. 21 | Exam. 22 | Exam. 23 | Exam. 24 | Exam. 25 | Exam. 26 | Exam. 27 | Exam. 28 |
|---|---|---|---|---|---|---|---|---|
| Metal type | Bi | Bi | Pb | Pb | Sn | Sn | Sb | Sb |
| Metal oxide (g)/terpineol (g) | $2.2 \times 10^{-4}$/ 1000 | $6.7 \times 10^{-2}$/ 1000 | $5.8 \times 10^{-5}$/ 1000 | $1.7 \times 10^{-2}$/ 1000 | $5.7 \times 10^{-5}$/ 1000 | $1.7 \times 10^{-2}$/ 1000 | $2.4 \times 10^{-4}$/ 1000 | $7.2 \times 10^{-2}$/ 1000 |
| Metal concentration in coating layer surface before calcination (ppm) | 0.05 | 15 | 0.05 | 15 | 0.05 | 15 | 0.05 | 15 |
| Metal concentration in coating layer surface after calcination (ppm) | 0.05 | 15 | 0.05 | 15 | 0.05 | 15 | 0.05 | 15 |
| Thickness of coating layer (nm) | 30 | 30 | 30 | 30 | 30 | 30 | 30 | 30 |
| Cracks | None | None | None | None | None | None | None | None |
| Relative luminance L (%) | 100 | 90 | 100 | 91 | 100 | 92 | 100 | 90 |
| Half-life supplied charge amount Q (C/cm$^2$) | 260 | 250 | 260 | 245 | 260 | 250 | 260 | 250 |

TABLE 12

|  | Exam. 29 | Exam. 30 | Exam. 31 | Exam. 32 | Exam. 33 | Exam. 34 | Exam. 35 | Exam. 36 |
|---|---|---|---|---|---|---|---|---|
| Metal type | Bi | Bi | Pb | Pb | Sn | Sn | Sb | Sb |
| Metal oxide (g)/terpineol (g) | $2.2 \times 10^{-4}$/ 1000 | $6.7 \times 10^{-2}$/ 1000 | $5.8 \times 10^{-5}$/ 1000 | $1.7 \times 10^{-2}$/ 1000 | $5.7 \times 10^{-5}$/ 1000 | $1.7 \times 10^{-2}$/ 1000 | $2.4 \times 10^{-4}$/ 1000 | $7.2 \times 10^{-2}$/ 1000 |
| Metal concentration in coating layer surface before calcination (ppm) | 0.05 | 15 | 0.05 | 15 | 0.05 | 15 | 0.05 | 15 |
| Metal concentration in coating layer surface after calcination (ppm) | 0.05 | 15 | 0.05 | 15 | 0.05 | 15 | 0.05 | 15 |
| Thickness of coating layer (nm) | 100 | 100 | 100 | 100 | 100 | 100 | 100 | 100 |
| Cracks | None | None | None | None | None | None | None | None |
| Relative luminance L (%) | 100 | 95 | 100 | 94 | 100 | 93 | 100 | 91 |
| Half-life supplied charge amount Q (C/cm$^2$) | 260 | 280 | 260 | 278 | 260 | 275 | 260 | 270 |

Examples 37 to 44

Fluorescent materials were prepared and fluorescent material substrate were fabricated and evaluated by the same method as in Examples 1 to 20, except that the concentration of metal in the coating layer surface was changed. The results are shown in Table 13 and Table 14.

TABLE 13

|  | Example 37 | Example 38 | Example 39 | Example 40 |
|---|---|---|---|---|
| Metal type | Bi | Pb | Sn | Sb |
| Metal oxide (g)/terpineol (g) | $6.7 \times 10^{-2}/$ 1000 | $1.7 \times 10^{-2}/$ 1000 | $1.7 \times 10^{-2}/$ 1000 | $7.2 \times 10^{-2}/$ 1000 |
| Metal concentration in coating layer surface before calcination (ppm) | 15 | 15 | 15 | 15 |
| Metal concentration in coating layer surface after calcination (ppm) | 15 | 15 | 15 | 15 |
| Thickness of coating layer (nm) | 30 | 30 | 30 | 30 |
| Cracks | None | None | None | None |
| Relative luminance L (%) | 100 | 100 | 100 | 100 |
| Half-life supplied charge amount Q (C/cm$^2$) | 100 | 180 | 170 | 180 |

TABLE 14

|  | Example 41 | Example 42 | Example 43 | Example 44 |
|---|---|---|---|---|
| Metal type | Bi | Pb | Sn | Sb |
| Metal oxide (g)/terpineol (g) | $6.7 \times 10^{-2}/$ 1000 | $1.7 \times 10^{-2}/$ 1000 | $1.7 \times 10^{-2}/$ 1000 | $7.2 \times 10^{-2}/$ 1000 |
| Metal concentration in coating layer surface before calcination (ppm) | 15 | 15 | 15 | 15 |
| Metal concentration in coating layer surface after calcination (ppm) | 15 | 15 | 15 | 15 |
| Thickness of coating layer (nm) | 100 | 100 | 100 | 100 |
| Cracks | None | None | None | None |
| Relative luminance L (%) | 100 | 100 | 100 | 100 |
| Half-life supplied charge amount Q (C/cm$^2$) | 200 | 230 | 220 | 235 |

Table 11 to Table 14 demonstrate that in a case where the fluorescent material particles are $SrGa_2S_4:Eu^{2+}$, when the concentration of metal in the coating material surface is 15 ppm, the half-life supplied charge amount Q is less than in a case in which the fluorescent material particles are ZnS:Cu, Al (P22). This means that where the amount of metal included in the coating layer is too large, the life of the fluorescent material shortens in a case of $SrGa_2S_4:Eu^{2+}$. The reasons therefor are not entirely clear, but one of them is apparently that where the metal that has diffused into the coating layer reaches the surface of fluorescent material particles, $Eu^{2+}$, which is an activator, is oxidized. For this reason, in a case of fluorescent material particles with $Eu^{2+}$ as an activator, it is preferred that the concentration of metal in the coating material surface be equal to or less than 10 ppm. The same results were observed, regardless of the particle size, when $BaAl_2S_4$:Eu, $CaAlSiN_3$:Eu, CaS:Eu, $Sr_2Si_5N_3$:Eu, $SrY_2S_4$:Eu, and $CaMgSi_2O_6$:Eu were used as the fluorescent material particles.

Other Embodiments

Aspects of the present invention can also be realized by a computer of a system or apparatus (or devices such as a PU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiments(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-041863, filed Feb. 25, 2009, which is hereby incorporated by reference herein in its entirety.

What is claimed is:

1. A method for manufacturing a fluorescent material substrate, comprising:
   providing a fluorescent material by including any metal from among Bi, Pb, Sn, and Sb in a coating layer that coats the surface of one or more fluorescent particles, the coating layer including $SiO_2$, so that a concentration of the metal in the surface of the coating layer becomes equal to or higher than 0.05 ppm; and
   disposing the fluorescent material having the fluorescent particles, the coating layer that coats the surface of the fluorescent particles, and the metal included in the coating layer on a substrate and heating the fluorescent material.

2. The method for manufacturing a fluorescent material substrate according to claim 1, wherein an activator of the fluorescent particles is $Eu^{2+}$.

3. The method for manufacturing a fluorescent material substrate according to claim 2, wherein the metal concentration in the coating layer surface is equal to or less than 10 ppm.

4. The method for manufacturing a fluorescent material substrate according to claim 1, wherein a matrix of the fluorescent particles is a thiogallate.

5. A method for manufacturing an image display device comprising an electron source substrate having an electron emitting device and a fluorescent material substrate having a fluorescent material, wherein the fluorescent material substrate is manufactured by the method for manufacturing a fluorescent material substrate according to claim 1.

6. A fluorescent material substrate comprising a substrate, fluorescent particles disposed on the substrate, a coating layer including $SiO_2$ and coating a surface of the fluorescent particles, and any metal from among Bi, Pb, Sn, Sb that is added to a surface of the coating layer, wherein a concentration of the metal in the surface of the coating layer is equal to or greater than 0.05 ppm.

7. The fluorescent material substrate according to claim 6, wherein an activator of the fluorescent particles is $Eu^{2+}$.

8. The fluorescent material substrate according to claim 7, wherein the metal concentration in the coating layer surface is equal to or less than 10 ppm.

9. The fluorescent material substrate according to claim 6, wherein a matrix of the fluorescent particles is a thiogallate.

10. An image display device comprising an electron source substrate having an electron emitting device and a fluorescent material substrate having a fluorescent material, wherein the fluorescent material substrate is the fluorescent material substrate according to claim 6.

* * * * *